United States Patent
Chen et al.

(10) Patent No.: US 12,166,553 B2
(45) Date of Patent: Dec. 10, 2024

(54) CHANNEL STATE INFORMATION ENCODING METHOD AND APPARATUS, STORAGE MEDIUM AND PROCESSOR

(71) Applicant: ZTE CORPORATION, Guangdong (CN)

(72) Inventors: Mengzhu Chen, Shenzhen (CN); Jin Xu, Shenzhen (CN); Jun Xu, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/178,006

(22) Filed: Mar. 3, 2023

(65) Prior Publication Data

US 2023/0283346 A1    Sep. 7, 2023

Related U.S. Application Data

(63) Continuation of application No. 16/875,685, filed on May 15, 2020, now Pat. No. 11,601,176, which is a
(Continued)

(30) Foreign Application Priority Data

Nov. 17, 2017   (CN) .......................... 201711149064.8

(51) Int. Cl.
*H04B 7/06*   (2006.01)
*H04W 28/18*   (2009.01)

(52) U.S. Cl.
CPC .......... *H04B 7/0626* (2013.01); *H04B 7/0632* (2013.01); *H04B 7/0639* (2013.01); *H04W 28/18* (2013.01)

(58) Field of Classification Search
None
See application file for complete search history.

(56) References Cited

U.S. PATENT DOCUMENTS

| 2013/0039327 A1 | 2/2013 | Gao et al. |
| 2013/0308715 A1 | 11/2013 | Nam et al. |

(Continued)

FOREIGN PATENT DOCUMENTS

| CN | 106877973 A | 6/2017 |
| CN | 106899379 A | 6/2017 |

(Continued)

OTHER PUBLICATIONS

Qualcomm Incorporated, "On Type I and Type II CSI parameters encoding", 3GPP TSG RAN WG1 #90, R1-1713397, Aug. 25, 2017, Prague, Czech (5 pages).
Samsung, "CQI Definition", 3GPP TSG RAN WG1 90bis, R1-1717607, Oct. 13, 2017, Prague, CZ (6 pages).
(Continued)

*Primary Examiner* — Kenny S Lin
(74) *Attorney, Agent, or Firm* — Foley & Lardner LLP (57) ABSTRACT

Provided is a method and an apparatus for encoding CSI, a storage medium, and a processor, where the method includes: placing a first type of information bits of the CSI in a first type of position indexes of the position index set, and determining, from the indexes other than the first type of position indexes determined by the first type of information bits in the position index set, indexes of the second type of information bits of the CSI, indexes of the third type of information bits of the CSI, and indexes of the fourth type of information bits in the position index set; or placing the fourth type of information bits in the fourth type of position indexes of the position index set, and determining indexes of the first type of information bits, indexes of the second type of information bits, and indexes of the third type of information bits of the CSI in the position index set from indexes other than the fourth type of position indexes determined by the fourth type of information bits in the position index set. The present disclosure solves the problem that positions of (Continued)

various types of information in the CSI reporting cannot be reasonably mapped in the related art.

7 Claims, 7 Drawing Sheets

Related U.S. Application Data continuation of application No. PCT/CN2018/116015, filed on Nov. 16, 2018.

(56) References Cited

U.S. PATENT DOCUMENTS

| | | | |
|---|---|---|---|
| 2016/0218832 | A1 | 7/2016 | Dabeer et al. |
| 2017/0177899 | A1 | 6/2017 | Ng et al. |
| 2017/0237479 | A1 | 8/2017 | Kim |
| 2017/0273056 | A1* | 9/2017 | Papasakellariou .... H04W 52/44 |
| 2017/0347270 | A1* | 11/2017 | Iouchi .................. H04L 5/0098 |
| 2018/0262250 | A1 | 9/2018 | Kim et al. |
| 2019/0082435 | A1 | 3/2019 | Noh et al. |
| 2019/0190655 | A1 | 6/2019 | Pan et al. |
| 2019/0268047 | A1 | 8/2019 | Kim et al. |
| 2019/0268926 | A1* | 8/2019 | Yoshimura ............ H04W 72/12 |
| 2020/0244425 | A1 | 7/2020 | Wu et al. |
| 2020/0366404 | A1 | 11/2020 | Jang et al. |
| 2022/0007359 | A1 | 1/2022 | Noh et al. |

FOREIGN PATENT DOCUMENTS

| | | |
|---|---|---|
| EP | 3 454 491 A1 | 3/2019 |
| WO | WO-2017/167082 A1 | 10/2017 |
| WO | WO-2017/177899 A1 | 10/2017 |
| WO | WO-2018/227614 A1 | 12/2018 |

OTHER PUBLICATIONS

Extended European Search Report on EP 18879153.7 dated Jul. 29, 2021 (10 pages).

Final Office Action on U.S. Appl. No. 16/875,685 DTD Jun. 14, 2022.

First Office Action for CN Appl. No. 201711149064.8 dated Mar. 30, 2021 (with English translation, 10 pages).

First Office Action for IN Appl. No. 202027023857, dated Jun. 7, 2022 (7 pages).

First Office Action for KR Appl. No. 10-2020-7017276, dated Sep. 15, 2022 (with English translation, 10 pages).

Foreign Action other than Search Report on non-Foley case related to U.S. Appl. No. 16/875,685 DTD Mar. 30, 2021.

Huawei et al., "Details of CSI reporting on PUCCH/PUSCH" 3GPP TSG RAN WG1 Meeting NR#3, R1 1715466, Sep. 21, 2017, Nagoya, Japan (9 pages).

International Search Report for PCT Appl. No. PCT/CN2018/116015, mailed Jan. 30, 2019 (4 pages).

Nokia et al: "Polar design for control channels", 3GPP Draft; RI-1704008, Athens, Greece; Feb. 17, 2017 (11 pages).

Non-Final Office Action on U.S. Appl. No. 16/875,685 DTD Mar. 4, 2022.

Notice of Allowance on U.S. Appl. No. 16/875,685 DTD Nov. 3, 2022.

Notice of Rejection for CN Appl. No. 2020-526872, dated Jun. 28, 2022 (with English translation, 7 pages).

NTT DOCOMO. "Polar Coding for CSI Reporting" 3GPP TSG RAN WGl Meeting 90bis R1-1718227, Oct. 13, 2017 (3 pages).

NTT DOCOMO: "Polar coding for CSI reporting" 3GPP TSG RAN WG1 Meeting 90bis; R1-1718227; Oct. 13, 2017; Prague, Czech Republic (3 pages).

US Office Action on U.S. Appl. No. 16/875,685 DTD Nov. 29, 2021.

Zte et al., "Joint coding scheme for UCI" 3GPP TSG RAN WG1 Meeting 90bis, R1-1718413, Oct. 9, 2017, Prague, Czechia (9 pages).

\* cited by examiner

CHANNEL STATE INFORMATION ENCODING METHOD AND APPARATUS, STORAGE MEDIUM AND PROCESSOR

This application is a continuation of U.S. application Ser. No. 16/875,685, filed May 15, 2020, which is a continuation of PCT/CN2018/116015, filed Nov. 16, 2018 which claims priority to Chinese Patent application No. CN 201711149064.8, filed Nov. 17, 2017, the content of which is incorporated herein by reference in its entirety.

TECHNICAL FIELD

The present disclosure relates to the field of communications, and in particular, to a method and an apparatus for encoding channel state information (CSI), a storage medium and a processor.

BACKGROUND

Polar codes encoding is employed for a control channel in 5G NR (New Radio). The encoding procedure of Polar codes is $x=u*G$, where u includes information bits and parity check bits, x is an encoded bit sequence, G is a generator matrix of the Polar codes, and a dimension of the generator matrix G is $N*N$, where N represents a power of 2. For Polar codes, reliabilities and BERs (Bit Error Ratio) of different input bit indexes (0~N-1) are different, and to improve performance of the Polar codes, it is usually necessary to map a bit sequence of Polar codes input bits to indices with high reliability or a low BER.

In 5G NR (New Radio), a joint coding mechanism is employed for part of CSI (channel state information) reporting, that is, different information (for example, CRI (CSI-RS Resource Index), RI (rank indicator), PMI (Precoding Matrix Indicator) and CQI (Channel Quality Indicator)) is encoded together; however, lengths of the CSI information may be different in different situations. In order to reduce or avoid blind detection, the CSI information is padded to have a same length in different situations. In order to determine lengths of padding bits and contents of various types of information in different situations, or to improve overall performance of CSI reporting, it is necessary to reasonably map the various types of information in the CSI reporting. However, in the related art, a manner for reasonable mapping of various types of information in CSI reporting is not yet available.

With regard to the foregoing problem in the related art, there is no effective solution currently.

SUMMARY

The present disclosure provides a method and an apparatus for encoding CSI, a storage medium and a processor in order to at least solve the problem that positions of various types of information in CSI reporting cannot be reasonably mapped in related art.

According to an embodiment of the present disclosure, a method for encoding CSI is provided, including: mapping CSI and a fourth type of information bits according to indexes in a position index set; where the CSI includes: a first type of information bits, a second type of information bits, and a third type of information bits. A manner of the mapping is: placing the first type of information bits in the CSI in a first type of position indexes in the position index set, determining, from the indexes in the position index set other than the first type of position indexes determined by the first type of information bits, indexes of the second type of information bits, indexes of the third type of information bits, and indexes of the fourth type of information bits in the position index set; or a manner of the mapping is: placing the fourth type of information bits in the fourth type of position indexes of the position index set, determining, from the indexes in the position index set other than the fourth type of position indexes determined by the fourth type of information bits, indexes of the first type of information bits, indexes of the second type of information bits, and indexes of the third type of information bits in the position index set; and performing Polar codes encoding on the mapped CSI and the fourth type of information bits to obtain an encoded bit sequence.

According to another embodiment of the present disclosure, an apparatus for encoding CSI is provided, including:
an mapping module configured to map the CSI and the fourth type of information bits according to indexes in a position index set, where the CSI includes: a first type of information bits, a second type of information bits, and a third type of information bits; a manner of the mapping is: placing the first type of information bits of the CSI in a first type of position indexes in the position index set, determining, from the indexes in the position index set other than the first type of position indexes determined by the first type of information bits, indexes of the second type of information bits, indexes of the third type of information bits, and indexes of the fourth type of information bits in the position index set; or a manner of the mapping is: placing the fourth type of information bits in a fourth type of position indexes of the position index set, determining, from the indexes in the position index set other than the fourth type of position indexes determined by the fourth type of information bits, indexes of the first type of information bits, indexes of the second type of information bits, and indexes of the third type of information bits in the position index set; and
an encoding module configured to perform Polar codes encoding on the mapped CSI and the fourth type of information bits to a obtain an encoded bit sequence.

According to yet another embodiment of the present disclosure, a storage medium including a stored program therein is provided, where the program when executed, performs the foregoing method for encoding CSI.

According to yet another embodiment of the present disclosure, a processor for executing a program is provided, where the program when executed, performs the foregoing method for encoding CSI.

According to yet another embodiment of the present disclosure, a communication device is provided, including:
a memory for storing CSI and a fourth type of information bits; and
a Polar codes encoder used to perform Polar codes encoding on the CSI and the fourth type of information bits to obtain an encoded bit sequence;
where the CSI includes: a first type of information bits, a second type of information bits, and a third type of information bits; and the CSI and the fourth type of information bits are mapped in the following manner: the first type of information bits, the second type of information bits, the third type of information bits, and the fourth type of information bits are mapped according to an order of the value of position index in Polar codes or according to an order of reliabilities of the indexes.

According to yet another embodiment of the present disclosure, a communication device is provided, including:
a Polar codes encoder used to perform Polar codes encoding on CSI; and a fourth type of information bits in order to obtain an encoded bit sequence; and
a Polar codes decoder for decoding Polar codes;
where the CSI includes: a first type of information bits, a second type of information bits, and a third type of information bits; and the CSI and the fourth type of information bits are mapped in the following manner: the first type of information bits, the second type of information bits, the third type of information bits, and the fourth type of information bits are mapped in sequence according to an order of the value of position index or according to an order of reliabilities of the indexes.

With this disclosure, a first type of information bits in CSI are placed in a first type of position indexes in a position index set, and indexes of a second type of information bits, a third type of information bits, and a fourth type of information bits in the position index set are determined by indexes in the position index set other than the first type of position indexes determined by the first type of information bits; or the fourth type of information bits are placed in the fourth type of position indexes in the position index set, and indexes of the first type of information bits, the second type of information bits, and the third type of information bits of the CSI in the position index set are determined by indexes in the position index set other than the fourth type of position indexes determined by the fourth type of information bits. It can be seen that the BLER performance of CSI reporting can be improved by the foregoing method which determines indexes of different types of information bits which are joint coded for CSI reporting, and therefore solves the problem that positions of various types of information in the CSI reporting cannot be reasonably mapped in related art.

BRIEF DESCRIPTION OF DRAWINGS

The drawings described herein are intended to provide further understanding of the present disclosure, and they constitute a part of the application. The schematic embodiments and the explanation thereof are used to illustrate the present disclosure, and pose no improper limitation on the present disclosure. In the drawings.

DESCRIPTION OF EMBODIMENTS

The present disclosure will be illustrated in detail below with reference to the drawings and in combination with the embodiments. It should be noted that the embodiments in this application and features in the embodiments may be mutually combined provided that no conflict is caused.

It should be noted that, the terms "first", "second", and the like in the specification, claims, and foregoing drawings of the present disclosure are intended to distinguish between similar objects but do not necessarily indicate an order or sequence.

Embodiment 1

Figure 1:
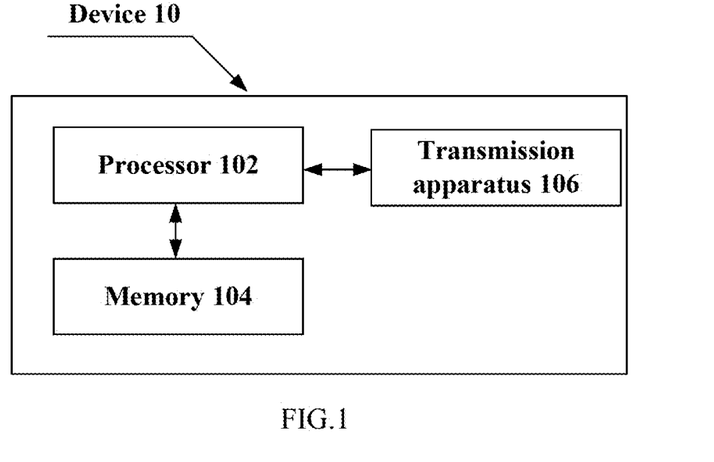
FIG. 1 is a structural block diagram of a hardware of a device that implements the method for encoding CSI of an embodiment of the present disclosure.

The embodiment provided in embodiment 1 of the present disclosure may be executed in a device, a computer terminal, or a similar arithmetic apparatus. Taking execution in a device as an example, FIG. 1 is a structural block diagram of a hardware of a device that implements a method for encoding CSI according to an embodiment of the present disclosure. As shown in FIG. 1, a device 10 may include one or a plurality of (only one is shown in the figure) processors 102 (the processor 102 may include but is not limited to processing apparatus such as a micro controller unit MCU or a field programmable gate array (FPGA)), a memory 104 configured to store data, and a transmission apparatus 106 for communication functions. Those skilled in the art understand that the structure shown in FIG. 1 is only schematic but does not limit structures of the foregoing electronic apparatuses. For example, the device 10 may further include more or less components than those shown in FIG. 1 or have different configurations from that shown in FIG. 1.

The memory 104 can be used to store software programs and modules of an application, such as program instructions/modules corresponding to the method for encoding CSI. The processor 102, by executing software programs and modules stored in the memory 104, executes various functional applications and data processing, that is, realizing the foregoing method. The memory 104 may include a high-speed random access memory, or a nonvolatile memory such as one or a plurality of magnetic storage apparatuses, flash memories, or other nonvolatile solid-state memories. In some examples, the memory 104 may further include memories remotely disposed with respect to the processor 102. These remote memories may be connected to the device 10 over a network. An example of the foregoing network includes but is not limited to: an Internet, a corporate Intranet, a local area network, a mobile communication network and a combination hereof.

The transmission apparatus 106 is configured to receive or send data via a network. A specific example of the foregoing network may include a wireless network provided by a communication provider of device 10. In one example, the transmission apparatus 106 includes a network interface controller (NIC) that may be connected to other network devices via a base station to communicate with the Internet. In one example, the transmission apparatus 106 can be a radio frequency (RF) module for wireless communication with the Internet.

Figure 2:
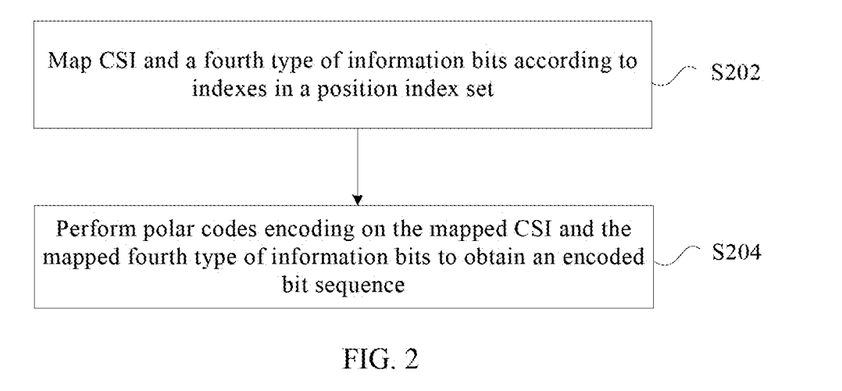
FIG. 2 is a flowchart of encoding CSI according to an embodiment of the present disclosure.

In this embodiment, a method for encoding CSI executed on the foregoing device is provided. FIG. 2 is a flowchart of encoding CSI according to an embodiment of the present disclosure, and as shown in FIG. 2, the flow includes the following steps:

Step 202, mapping the CSI and a fourth type of information bits according to indexes in a position index set; where the CSI includes: a first type of information bits, a second type of information bits, and a third type of information bits; a manner of the mapping is: placing the first type of information bits in a first type of position indexes of the position index set, determining, from the indexes in the position index set other than the first type of position indexes determined by the first type of information bits, indexes of the second type of information bits, indexes of the third type of information bits, and indexes of the fourth type of information bits in the position index set; or a manner of the mapping is: placing the fourth type of information bits in a fourth type of position indexes of the position index set, and determining, from the indexes in the position index set other than the fourth type of position indexes determined by the fourth type of information bits, indexes of the first type of information bits, indexes of the second type of information bits, and indexes of the third type of information bits in the position index set; and Step 204, performing Polar codes encoding on the mapped CSI and the fourth type of information bits to obtain an encoded bit sequence.

Through the foregoing steps 202 and 204, various types of information bits in the CSI can be mapped in the position index set, specifically, that is: placing the first type of information bits of the CSI in the first type of position indexes of the position index set, determining, from the indexes in the position index set other than the first type of position indexes determined by the first type of information bits, indexes of the second type of information bits, indexes of the third type of information bits, and indexes of the fourth type of information bits in the position index set; or placing the fourth type of information bits in the fourth type of position indexes of the position index set, determining, from the indexes in the position index set other than the fourth type of position indexes determined by the fourth type of information bits, indexes of the first type of information bits, indexes of the second type of information bits, and indexes of the third type of information bits in the position index set.

Figure 3A:
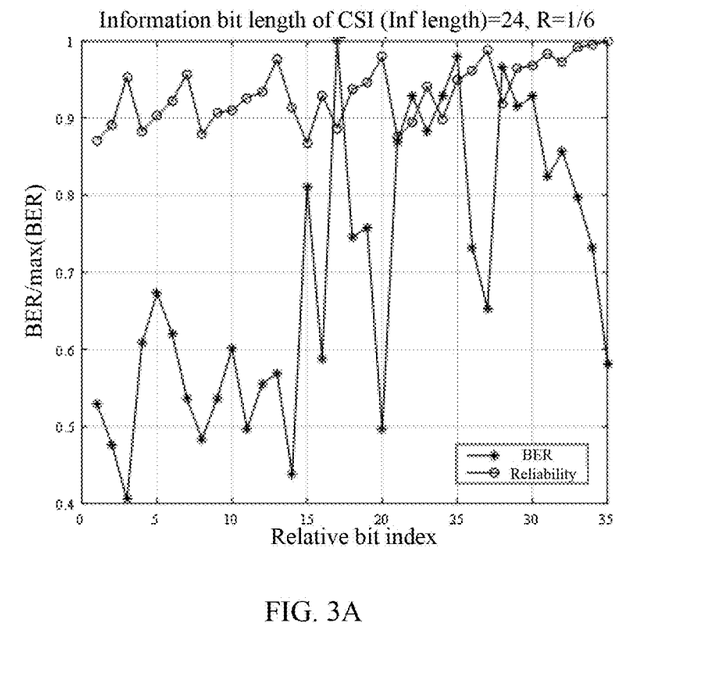
FIG. 3A is a simulation schematic diagram of relationship between indexes and BER according to an embodiment of the present disclosure.

It should be noted that reliabilities and bit error ratio (BER) of different input bit indexes (0~N−1) may be different for the Polar code. To improve Polar codes performance, it is usually required to map the bit sequence of the Polar codes input bit to indexes with higher reliabilities or lower BER. For encoding the CSI, it is mapping the CSI and parity check bits obtained from encoding CSI to index positions with higher reliabilities or lower BER, where the reliabilities can be calculated with density evolution or Gaussian approximation or obtained from positions of the indexes in a predefined sequence, and the BER can be obtained by computer simulation. Specifically, FIG. 3A illustrates the simulation relationship between indexes and the BER.

Figure 3B:
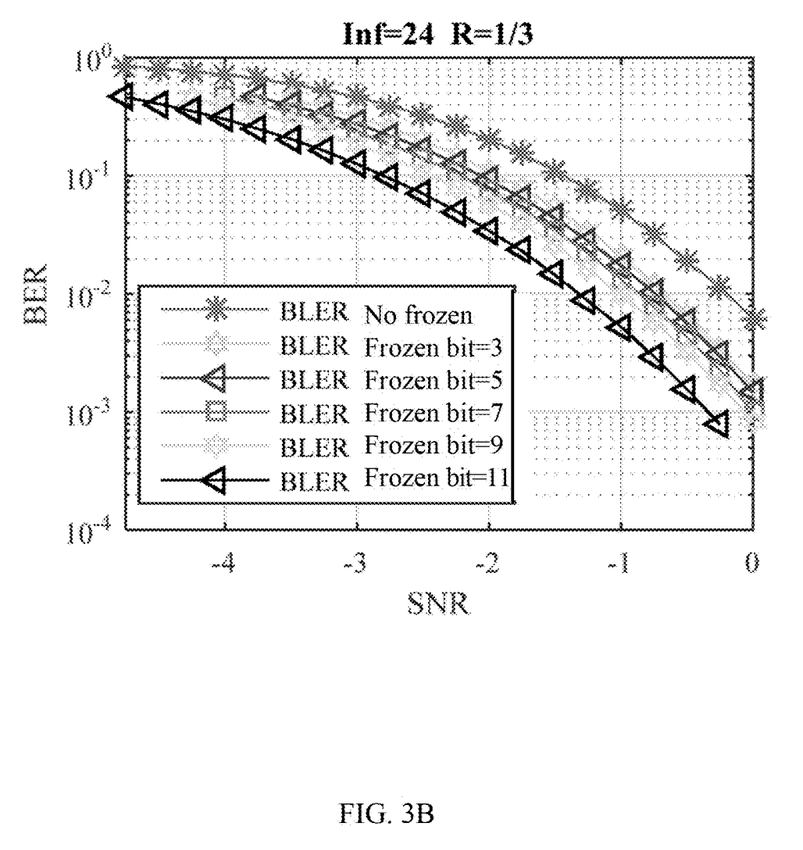
FIG. 3B is a simulation schematic diagram of performance according to an embodiment of the present disclosure.

Since the length of CSI information may be different in different situations, to reduce (avoid) blind detection, the CSI information is padded to the same length. However, in CSI reporting, the lengths of the PMI and the CQI are related to the RI. Therefore, if the RI (and the CRI; in LTE, the CRI and the RI are jointly coded) can be placed in some specific positions so that the RI can be determined first, it will contribute to the determination of the padding bit length and other information. In another aspect, since the bit length of the parity check bits is related to the information length of the CSI, in CSI reporting, if the parity check bits can be placed after some specific positions and the RI is placed in other specific positions, the RI can be more easily determined after Polar codes are decoded, and the padding bit length and other information can be determined later. Furthermore, after the length and position of the padding bits are determined, the padding bits can be seen as known bits (or frozen bits) during decoding to improve the decoding performance. FIG. 3B shows performance curves with different numbers of frozen bits.

Therefore, indexes of various types of information bits in joint coding for CSI reporting can be determined with the foregoing method, and BLER performance of the CSI reporting can be improved and the problem that positions of various types of information in the CSI reporting cannot be reasonably mapped in related art can be solved.

In specific implementations of the embodiment, the first type of information bits involved in this embodiment include at least one of the following: a CRI and an RI.

In addition, the first type of information bits involved in this embodiment may also include at least one of the following: a bit sequence obtained by encoding the CRI according to a first encoding method; a bit sequence obtained by encoding the RI according to the first encoding method; and a bit sequence obtained by encoding the CRI and the RI according to the first encoding method.

It should be noted that, since the CRI may affect the quantity of bits of the RI, the RI may affect the quantity of bits of the PMI, and the RI and PMI may affect the quantity of bits of the CQI in CSI information, encoding the CRI and the RI (that is, the first type of bit information) first by using the first encoding method before encoding CSI, and perform Polar codes encoding on the encoded bit sequence and other information in the CSI together, the performance of the CRI and the RI can be improved.

For example, the CRI and the RI are represented by three bits respectively and then the length of the first type of information bits is 6 bits; and the first type of information bits of 6 bits is encoded to 7 bits, 9 bits, or 12 bits by using the first encoding method.

For example, the first type of information bits of K bits is encoded to a length of floor (K/R) or ceil (K/R) bits by using the first encoding method, where R is a code rate and 0<R<1, floor (•) represents rounding a number down to the nearest integer, and ceil (•) represents rounding a number up to the nearest integer.

The first encoding method may be Reed-Muller encoding, parity check codes, cyclic redundancy check encoding, BCH encoding, Hamming code encoding, convolutional encoding, generator matrix encoding, Turbo encoding, low density parity check encoding, or Hash encoding.

In optional implementations of the embodiment, the second type of information bits involved in this embodiment are padding bits. The third type of information bits includes at least one of the following: precoding matrix indicator (PMI) and channel quality indicator (CQI). The fourth type of information bits are parity check bits.

Based on the specific information bits of the CSI in the foregoing optional implementation, the fourth type of information bits are obtained by encoding, through a second encoding method, at least one of the following: the first type of information bits, the second type of information bits, or the third type of information bits.

It should be noted that the first encoding method or the second encoding method includes at least one of the following:

Reed-Muller encoding, parity check codes, cyclic redundancy check encoding, BCH encoding, Hamming code encoding, convolutional encoding, generator matrix encoding, Turbo encoding, low density parity check encoding, or Hash encoding.

With regard to the manner of the mapping involved in step S202 of the embodiment, the first type of information bits, the second type of information bits, the third type of information bits, and the fourth type of information bits are mapped in sequence according to an order of the value of position index in Polar codes or according to an order of reliabilities of the indexes.

With regard to the manner of the arranging involved in step S202 of the embodiment, in a case that indexes of the first type of information bits are firstly determined, the first type of position indexes involved in the embodiment are indexes having least index numbers and having a same quantity as that of the first type of information bits.

It should be noted that according to the computer simulation result in FIG. 3A, bits with smaller index numbers in the position indexes have lower BER. Therefore, placing the first type of bit information (CRI and RI) at the indexes having least index numbers can improve the performance of CSI reporting.

Based on the foregoing first type of position indexes, the manner of determining, from the indexes in the position index set other than the first type of position indexes determined by the first type of information bits, indexes of the second type of information bits, indexes of the third type of information bits, and indexes of the fourth type of information bits in the position index set of step S202 of the embodiment may include:

Step S202-1: determining, the indexes in the position index set having a same quantity as that of the fourth type of information bits and having largest values as the indexes of the fourth type of information bits; and Step S202-2: determining, according to the values of position indexes and quantities of the second type of information bits and the third type of information bits, the indexes of the second type of information bits and the indexes of the third type of information bits from the undetermined indexes in the position index set, or the indexes of the third type of information bits and the indexes of the second type of information bits from the undetermined indexes in the position index set; or determining, according to reliabilities of indexes and quantities of the second type of information bits and the third type of information bits, the indexes of the second type of information bits and the indexes of the third type of information bits from the undetermined indexes in the position index set, or the indexes of the third type of information bits and the indexes of second type of information bits from the undetermined indexes in the position index set.

Based on the foregoing first type of position indexes, the manner of determining, from the indexes in the position index set other than the first type of position indexes determined by the first type of information bits, indexes of the second type of information bits, indexes of the third type of information bits, and indexes of the fourth type of information bits in the position index set of step S202 of the embodiment may include:

Step S202-3: determining, from indexes in the position index set other than the first type of position indexes determined by the first type of information bits, indexes having a same quantity as that of the second type of information bits and with the lowest reliabilities as the indexes of the second type of information bits; and Step S202-4: determining, according to an mapping of position index values and quantities of the third type of information bits and the fourth type of information bits, the indexes of the third type of information bits and the indexes of the fourth type of information bits in sequence from the undetermined indexes in the position index set, or the indexes of the fourth type of informa-
tion bits and the indexes of the third type of information bits in sequence from the undetermined indexes in the position index set; or determining, according to reliabilities of indexes and quantities of the third type of information bits and the fourth type of information bits, the indexes of the third type of information bits and the indexes of the fourth type of information bits in sequence from the undetermined indexes in the position index set, or the indexes of the fourth type of information bits and indexes of the third type of information bits in sequence from the undetermined indexes in the position index set.

In another optional implementation of the embodiment, in a case that indexes of the first type of information bits are firstly determined, the first type of position indexes are indexes having the highest reliabilities and having a same quantity as that of the first type of information bits in the position index set.

It should be noted that according to the attribute of Polar codes, the position indexes with higher reliabilities have lower BER. Therefore, placing the first type of bit information (CRI and RI) at indexes with the highest reliabilities among the bit indexes can improve the performance of CSI reporting.

Based on the foregoing first type of position indexes, the manner of determining, from the indexes in the position index set other than the first type of position indexes determined by the first type of information bits, indexes of the second type of information bits, indexes of the third type of information bits, and the indexes of fourth type of information bits in the position index set of step 202 of the embodiment may include:

Step S202-5: determining, from indexes in the position index set other than the first type of position indexes determined by the first type of information bits, indexes having a same quantity as that of the fourth type of information bits and having largest index numbers as the indexes of the fourth type of information bits; and Step S202-6: determining, according to an mapping of position index values and quantities of the second type of information bits and the third type of information bits, the indexes of the second type of information bits and the indexes of the third type of information bits in sequence from the undetermined indexes in the position index set, or the indexes of the third type of information bits and the indexes of the second type of information bits in sequence from the undetermined indexes in the position index set; or Step S202-7: determining, according to reliabilities of position indexes and quantities of the second type of information bits and the third type of information bits, the indexes of the second type of information bits and the indexes of the third type of information bits in sequence from the undetermined indexes in the position index set, or the indexes of the third type of information bits and the indexes of the second type of information bits in sequence from the undetermined indexes in the position index set.

Based on the foregoing first type of position indexes, the manner of determining, from the indexes in the position index set other than the first type of position indexes determined by the first type of information bits, indexes of the second type of information bits, indexes of the third type of information bits, and indexes of the fourth type of information bits in the position index set of step 202 of the embodiment may include:

Step S202-8: determining, from the indexes in the position index set other than the first type of position indexes determined by the first type of information bits, indexes having a same quantity as that of the second type of information bits and with the lowest reliabilities as the indexes of the second type of information bits; and Step S202-9: determining, according to an mapping of position index values and quantities of the third type of information bits and the fourth type of information bits, the indexes of the third type of information bits and the indexes of the fourth type of information bits in sequence from the undetermined indexes in the position index set, or the indexes of the fourth type of information bits and the indexes of the third type of information bits in sequence from the undetermined indexes in the position index set; or determining, according to reliabilities of indexes and quantities of the third type of information bits and the fourth type of information bits, the indexes of the third type of information bits and the indexes of the fourth type of information bits in sequence from the undetermined indexes in the position index set, or the indexes of the fourth type of information bits and the third type of information bits in sequence from the undetermined indexes in the position index set.

In another optional implementation of the embodiment, in a case that indexes of the fourth type of information bits are firstly determined, the fourth type of position indexes are indexes having largest index numbers and having a same quantity as that of the fourth type of information bits in the position index set.

Based on the foregoing fourth type of position indexes, the manner of determining, from the indexes in the position index set other than the fourth type of position indexes determined by the fourth type of information bits, indexes of the first type of information bits, indexes of the second type of information bits, and indexes of the third type of information bits in the position index set of step S202 of the embodiment may include:

Step S202-10: determining, from indexes in the position index set other than the fourth type of position indexes determined by the fourth type of information bits, indexes having a same quantity as that of the first type of information bits and having largest values as the indexes of the first type of information bits; and Step S202-11: determining, according to a mapping of the position index values and quantities of the second type of information bits and the third type of information bits, the indexes of the second type of information bits and the indexes of the third type of information bits in sequence from the undetermined indexes in the position index set, or the indexes of the third type of information bits and the indexes of the second type of information bits in sequence from the undetermined indexes in the position index set; or determining, according to reliabilities of indexes and quantities of the second type of information bits and the third type of information bits, the indexes of the second type of information bits and the indexes of the third type of information bits in sequence from the undetermined indexes in the position index set, or the indexes of the third type of information bits and the indexes of the second type of information bits in sequence from the undetermined indexes in the position index set.

Based on the foregoing fourth type of position indexes, the manner of determining indexes of the first type of information bits, the second type of information bits, and the third type of information bits in the position index set from indexes in the position index set other than the fourth type of position indexes determined by the fourth type of information bits of step S202 of the embodiment may include:

Step S202-12: determining, from indexes in the position index set other than the fourth type of position indexes determined by the fourth type of information bits, indexes having a same quantity as that of the first type of information bits and with the highest reliabilities as the indexes of the first type of information bits; and Step S202-13: determining, according to a mapping of position index values and quantities of the second type of information bits and the third type of information bits, the indexes of the second type of information bits and the indexes of the third type of information bits in sequence from the undetermined indexes in the position index set, or the indexes of the third type of information bits and the indexes of the second type of information bits in sequence from the undetermined indexes in the position index set; or determining, according to reliabilities of indexes and quantities of the second type of information bits and the third type of information bits, the indexes of the second type of information bits and the indexes of the third type of information bits in sequence from the undetermined indexes in the position index set, or the indexes of the third type of information bits and the indexes of the second type of information bits in sequence from the undetermined indexes in the position index set.

It should be noted that, in the first type of information bits, the positional relationship between the CRI and the RI is: the position of the CRI is in front of the position of the RI; or, the position of the RI is in front of the position of the CRI; or, the position of the bit sequence obtained by encoding the CRI according to the first encoding method is in front of the position of the bit sequence obtained by encoding the RI according to the first encoding method; or, the position of the bit sequence obtained by encoding the CRI according to the first encoding method is behind the position of the bit sequence obtained by encoding the RI according to the first encoding method.

Since the value of the CRI may affect the quantity of bits of the RI, for example, if the quantity of ports of the CSI-RS corresponding to the value CRI is 2, then the quantity of bits of the RI may be 1, thus the position of the CRI may be set in front of the position of the RI; or, the position of the bit sequence obtained by encoding the CRI according to the first encoding method is in front of the position of the bit sequence obtained by encoding the RI according to the first encoding method.

In addition, in the third type of information bits, the positional relationship between the PMI and the CQI is: the position of the PMI is in front of the position of the CQI; or the position of the CQI is in front of the position of the PMI.

Since the value of PMI may affect the quantity of bits of the CQI, the position of the PMI can be set in front of the position of the CQI.

It should be noted that, if the first type of information bits or the second type of information bits or the third type of information bits or the fourth type of information bits are not included during CSI reporting, the subsequent steps can be continued by skipping this step in the procedure of determining various types of information bits.

This disclosure will be exemplified below in combination with specific implementations of the embodiments.

In CSI reporting, the lengths of the PMI and the CQI are related to the RI. Therefore, if the RI (and the CRI; in LTE, the CRI and the RI are jointed coded) can be placed in some specific positions so that the RI can be determined, it will contribute to the determination of the padding bit length and content of other information.

In another aspect, since the bit length of the fourth type of information bits which is the parity check bits is related to the information length of the CSI, in CSI reporting, if the parity check bits can be placed after some specific positions and the RI in other specific positions, the RI can be more easily determined after Polar codes are decoded, and the padding bit length and other information can be determined later.

It is assumed that the lengths of the CRI, the RI, the PMI, the CQI, the parity check bits and the padding bits are L_CRI, L_RI, L_PMI, L_CQI, L_A and L_Pad, respectively.

FIG. 3A is a simulation schematic diagram of the relation between indexes and the BER according to an embodiment of the present disclosure.

Optional Implementation 1

As shown in FIG. 3A, positions with smaller index sequence numbers are corresponded by smaller BER. Therefore, in this implementation, the CSI is placed in the position index set in the following manner:

(1) placing the first type of information bits at the (L_CRI+L_RI) indexes having least value in the position indexes;

(2) placing the fourth type of information bits at the L_A indexes having largest values in the position indexes; and (3.1) placing the second type of information bits and the third type of information bits at the remaining positions in sequence according to the index values (from small to large or vice versa);

The mapping of various types of information in the CSI reporting is:

| The first type of information bits | The second type of information bits | The third type of information bits | The fourth type of information bits |
|---|---|---|---|
| | | or | |
| The first type of information bits | The third type of information bits | The second type of information bits | The fourth type of information bits |

It should be noted that, with the foregoing implementation, the first type of information bits can be decoded at the earliest time during decoding of Polar codes, so that the length and position of the second type of information bits and the third type of information bits can be inferred. Furthermore, the second type of information bits, that is, the padding bits, can be regarded as known bits (or frozen bits), thereby improving decoding performance. For details, refer to FIG. 3B and Reference [1] (3GPP, RAN1 #91 meeting, R1-1719520)

Specifically, assuming a case of the joint coding for CSI reporting, the bit length of the CRI L_CRI=3, the bit length of the RI L_RI=3, and the minimum information bit length of the CSI (including the CRI, the RI, the PMI, and the CQI) is 14 and the maximum is 23, all the CSI information bits that are joint coded are padded to 24 bits, and the length of the parity check bits is 11, and the position index set is 1 to 35.

(1) placing the CRI and the RI at the (L_CRI+L_RI) indexes having smallest value in the position indexes; that is, placing the CRI and the RI at indexes with sequence numbers from 1-6 in the position indexes;

(2) placing the parity check bits at the L_A indexes having largest values in the position indexes, that is, placing the parity check bits at indexes with index numbers from 25-35 in the position indexes; and (3.1) placing the padding bits, the PMI and the CQI at the remaining positions in sequence according to the index values (from small to large or vice versa);

or (3.2) placing the second type of information bits and the third type of information bits at the remaining positions in sequence according to an order of reliabilities of indexes (from low to high or vice versa).

Optional Implementation 2

As shown in FIG. 3A, positions with smaller index sequence numbers are corresponded by smaller BER. Therefore, in this implementation, the CSI is placed in the position index set in the following manner:

(1) placing the first type of information bits at the (L_CRI+L_RI) indexes having smallest value in the position indexes;

(2) placing the second type of information bits at the L_Pad indexes with the lowest reliability in the position indexes; and (3.1) placing the third type of information bits and the fourth type of information bits at the remaining positions in sequence according to the index values (from small to large or vice versa); or (3.2) placing the third type of information bits and the fourth type of information bits at the remaining positions in sequence according to an order of reliabilities of indexes (from low to high or vice versa).

Optional Implementation 3

As shown in FIG. 3A, indexes with higher reliability have lower BER. Therefore, in this implementation, the CSI is placed in the position index set in the following manner:

placing the first type of information bits at the (L_CRI+L_RI) indexes with the highest reliability in the position indexes;

In an example, assuming a case of the joint coding for CSI reporting, the bit length of the CRI L_CRI=3, the bit length of the RI L_RI=3, and the minimum information bit length of the CSI (including the CRI, the RI, the PMI, and the CQI) is 14 and the maximum is 23, and the length of the parity check bits is 11. If all the CSI information bits that are jointly coded are padded to 23 or 24, and the bit position index set is 1-34 or 1-35, the index positions of the first type of information bits (that is, the CRI and the RI) with different code rates calculated by a computer are as shown in Table 1.

TABLE 1

| | Positions of the first type of information bits with different code rates | |
|---|---|---|
| Code rate (R) | The information length of the CSI bits is 23. | The information length of the CSI bits is 24. |
| 2/3 | 9, 13, 17, 31, 33, 34 | 9, 15, 16, 17, 31, 35 |
| 1/2 | 1, 3, 5, 9, 19, 34 | 1, 3, 10, 20, 27, 35 |
| 1/3 | 7, 8, 10, 12, 13, 34 | 7, 8, 9, 13, 14, 35 |
| 1/6 | 3, 4, 8, 9, 10, 14 | 1, 2, 3, 8, 9, 14 |
| 1/12 | 3, 4, 7, 8, 9, 14 | 1, 2, 3, 4, 8, 9 |

(2) placing the fourth type of information bits at the L_A indexes having largest values among the remaining of the position indexes; and (3.1) placing the second type of information bits and the third type of information bits at the remaining positions in sequence according to the index values (from small to large or vice versa); or (3.2) placing the second type of information bits and the third type of information bits at the remaining positions in sequence according to an arrangement of reliabilities of indexes (from low to high or vice versa);

Optional Implementation 4

As shown in FIG. 3A, indexes with higher reliability have lower BER. Therefore, in this implementation, the CSI is placed in the position index set in the following manner:

(1) placing the first type of information bits at the (L_CRI+L_RI) indexes with the highest reliability in the position indexes;

(2) placing the second type of information bits at the L_Pad indexes with the lowest reliability among the remaining indexes in the position indexes; and (3.1) placing the third type of information bits and the fourth type of information bits at the remaining positions in sequence according to the index values (from small to large or vice versa); or (3.2) placing the third type of information bits and the fourth type of information bits at the remaining positions in sequence according to an order of reliabilities of indexes (from low to high or vice versa).

Optional Implementation 5

Since the bit length of the parity check bits is related to the information length of the CSI, in CSI reporting, if the parity check bits can be placed after some specific positions and the RI in other specific positions, the RI can be more easily determined after polar codes are decoded, and the padding bit length and other information can be determined later. Therefore, in this implementation, the CSI is placed in the position index set in the following manner:

(1) placing the fourth type of information bits at the L_A indexes having largest values in the position indexes;

(2) placing the first type of information bits at the (L_CRI+L_RI) indexes with the highest reliability among the remaining indexes in the position indexes; and (3.1) placing the second type of information bits and the third type of information bits at the remaining positions in sequence according to the index values (from small to large or vice versa); or (3.2) placing the second type of information bits and the third type of information bits at the remaining positions in sequence according to an order of reliabilities of indexes (from low to high or vice versa).

Optional Implementation 6

Since the bit length of the parity check bits is related to the information length of the CSI, in CSI reporting, if the parity check bits can be placed after some specific positions and the RI in other specific positions, the RI can be more easily determined after polar codes are decoded, and the padding bit length and other information can be determined later. Therefore, in this implementation, the CSI is placed in the position index set in the following manner:

(1) placing the fourth type of information bits at the L_A indexes having largest values in the position indexes;

(2) placing the first type of information bits at the (L_CRI+L_RI) indexes having largest sequence numbers among the remaining indexes in the position indexes; and (3.1) placing the second type of information bits and the third type of information bits at the remaining positions in sequence according to the index values (from small to large or vice versa); or (3.2) placing the second type of information bits at the remaining positions in sequence according to an order of reliabilities of indexes (from low to high or vice versa);

With regard to the forgoing optional implementations 1-6, the first type of information bits can be CRI and/or RI, or, bit sequence encoded by using the CRI and/or RI information. The encoding method can be: Reed-Muller encoding, parity check codes, cyclic redundancy check encoding, BCH encoding, Hamming code encoding, convolutional encoding, generator matrix encoding, Turbo encoding, low density parity check encoding, or Hash encoding.

It should be noted that, the length and position of the padding bits may be obtained by a receiver according to contents of the CRI and the RI after Polar codes are decoded, and the CRI, the RI and padding bits may be regarded as known bits to perform Polar codes decoding again so that the performance of the remaining information can be improved. Specifically, the performance curves are shown in FIG. 3B.

From the description of the forgoing implementations, those skilled in the art could clearly understand that the method according to the forgoing embodiment can be achieved by software together with the necessary general-purpose hardware platforms, and certainly can also be achieved only by hardware, but the former would be preferred in many occasions. Based on this understanding, the technical solution of the present disclosure in nature or the portion by which the disclosure contributes to the prior art can be implemented in the form of software products, and the computer software products are stored in such a storage medium as ROM/RAM, hard disk, compact disk and the like, containing several instructions capable of enabling a terminal device (a cell phone, a computer, a server, or a network device) to execute the method described in the embodiments of the present disclosure.

Embodiment 2

In this embodiment, an apparatus for encoding CSI is also provided. The apparatus is used to implement the foregoing embodiments and implementations, and those which have been illustrated will not be described herein further. As used hereafter, the term "module" may implement a combination of software and/or hardware of a predetermined function. The apparatus described in the following embodiment is preferably implemented as software, but hardware or a combination of software and hardware, are also possible and can be contemplated.

Figure 4:
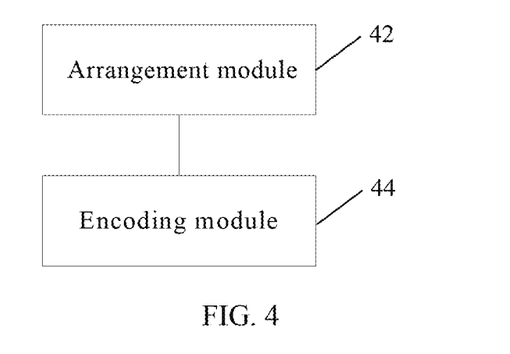
FIG. 4 is a structural block diagram of an apparatus for encoding CSI according to an embodiment of the present disclosure.

FIG. 4 is a structural block diagram of an apparatus for encoding CSI according to an embodiment of the present disclosure. As shown in FIG. 4, the apparatus includes:

a mapping module 42 used to map the CSI and a fourth type of information bits according to indexes in a position index set; where the CSI includes: a first type of information bits, a second type of information bits, and a third type of information bits; a manner of the mapping is: placing the first type of information bits in the first type of position indexes of the position index set, and determining, from the indexes in the position index set other than the first type of position indexes determined by the first type of information bits, indexes of the second type of information bits, indexes of the third type of information bits, and indexes of the fourth type of information bits in the position index set; or a manner of the mapping is: placing the fourth type of information bits in the fourth type of position indexes of the position index set, and determining, from the indexes in the position index set other than the fourth type of position indexes determined by the fourth type of information bits, indexes of the first type of information bits, indexes of the second type of information bits, and indexes of the third type of information bits in the position index set; and an encoding module 44 coupled to the mapping module 42 used to perform Polar codes encoding on the mapped CSI and the fourth type of information bits to obtain an encoded bit sequence.

It should be noted that the forgoing modules may be implemented by software or hardware. In the case of hardware, they can be implemented in but is not limited to the following manner: the forgoing modules are all located in a same processor; or the forgoing modules are respectively located in different processors in any arbitrary combination.

A storage medium including a program stored therein is further provided in an embodiment of the present disclosure, where the program when executed, performs any one of the forgoing methods.

Optionally, in the embodiment, the foregoing storage medium may be configured to store program codes for performing the following steps:

S1: mapping CSI according to indexes in the position index set;

where a manner of the mapping is: placing the first type of information bits of the CSI in the first type of position indexes of the position index set, and determining, from the indexes in the position index set other than the first type of position indexes determined by the first type of information bits, indexes of the second type of information bits, indexes of the third type of information bits, and indexes of the fourth type of information bits in the position index set; or a manner of the mapping is: placing the fourth type of information bits in the fourth type of position indexes of the position index set, and determining, from the indexes in the position index set other than the fourth type of position indexes determined by the fourth type of information bits, indexes of the first type of information bits, indexes of the second type of information bits, and indexes of the third type of information bits in the position index set; and S2: performing Polar codes encoding on the mapped CSI and the fourth type of information bits to obtain an encoded bit sequence.

Optionally, in this embodiment, the foregoing storage medium may include but is not limited to: a USB flash drive, a read-only memory ROM, a random access memory RAM, a mobile hard disk, a magnetic disk, an optical disc, or any medium that can store program codes.

A processor for executing a program is further provided in an embodiment of the present disclosure, where the program when executed, performs steps in any one of the forgoing methods.

Optionally, in the embodiment, the foregoing program is configured to perform the following steps:

S1: mapping the CSI according to indexes in a position index set;

where a manner of the mapping is: placing the first type of information bits of the CSI in the first type of position indexes of the position index set, and determining, from the indexes in the position index set other than the first type of position indexes determined by the first type of information bits, indexes of the second type of information bits, indexes of the third type of information bits, and indexes of the fourth type of information bits in the position index set; or a manner of the mapping is: placing the fourth type of information bits in the fourth type of position indexes of the position index set, and determining, from the indexes in the position index set other than the fourth type of position indexes determined by the fourth type of information bits, indexes of the first type of information bits, indexes of the second type of information bits, and indexes of the third type of information bits in the position index set; and S2: performing Polar codes encoding on the mapped CSI and the fourth type of information bits to obtain an encoded bit sequence.

Optionally, the specific examples in this embodiment may refer to the foregoing embodiment and the examples described in the optional implementations, and will not be described herein again in this embodiment.

Optionally, a communication device is further provided in an embodiment of the present disclosure, including:

a memory for storing CSI and a fourth type of information bits; and a Polar codes encoder used to perform Polar codes encoding on the CSI and the fourth type of information bits to obtain an encoded bit sequence.

Where the CSI includes: a first type of information bits, a second type of information bits, and a third type of information bits. The CSI and the fourth type of information bits are mapped in the following manner: the first type of information bits, the second type of information bits, the third type of information bits, and the fourth type of information bits are mapped in sequence according to an order of the value of position index in Polar codes or according to an order of reliabilities of the indexes.

Figure 5:
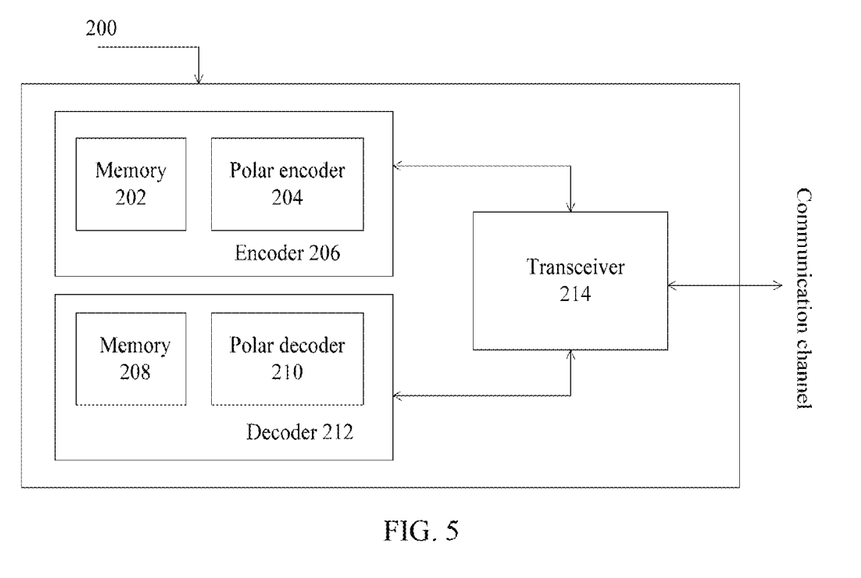
FIG. 5 is a structural block diagram of a communication device according to an embodiment of the present disclosure.

Specifically, as shown in FIG. 5, the communication device 200 includes an encoder 206, a decoder 212, and a transceiver 214 that transmits and/or receives code words after Polar codes encoding via a communication channel. The encoder 206 includes a memory 202 and a Polar codes encoder 204. The memory 202 can be used to store data (CSI and the fourth type of information bits) encoded by the Polar codes encoder 204. The Polar codes encoder 204 is used to perform Polar codes encoding on the CSI and the fourth type of information bits stored in the memory 202 to obtain an encoded bit sequence and transmit the bit sequence to another device.

Optionally, the specific examples in this embodiment may refer to the foregoing embodiment and the examples described in the optional implementations, and will not be described herein again in this embodiment.

Optionally, a communication device is further provided in an embodiment of the present disclosure, including:

a Polar codes encoder configured to perform Polar codes encoding on CSI and a fourth type of information bits in order to obtain an encoded bit sequence; and a Polar codes decoder for decoding Polar codes.

Where the CSI includes: a first type of information bits, a second type of information bits, and a third type of information bits. The CSI and a fourth type of information bits are mapped in the following manner: the first type of information bits, the second type of information bits, the third type of information bits, and the fourth type of information bits are mapped in sequence according to an order of the value of position indexes in Polar codes or according to an order of reliabilities of the indexes.

Figure 6:
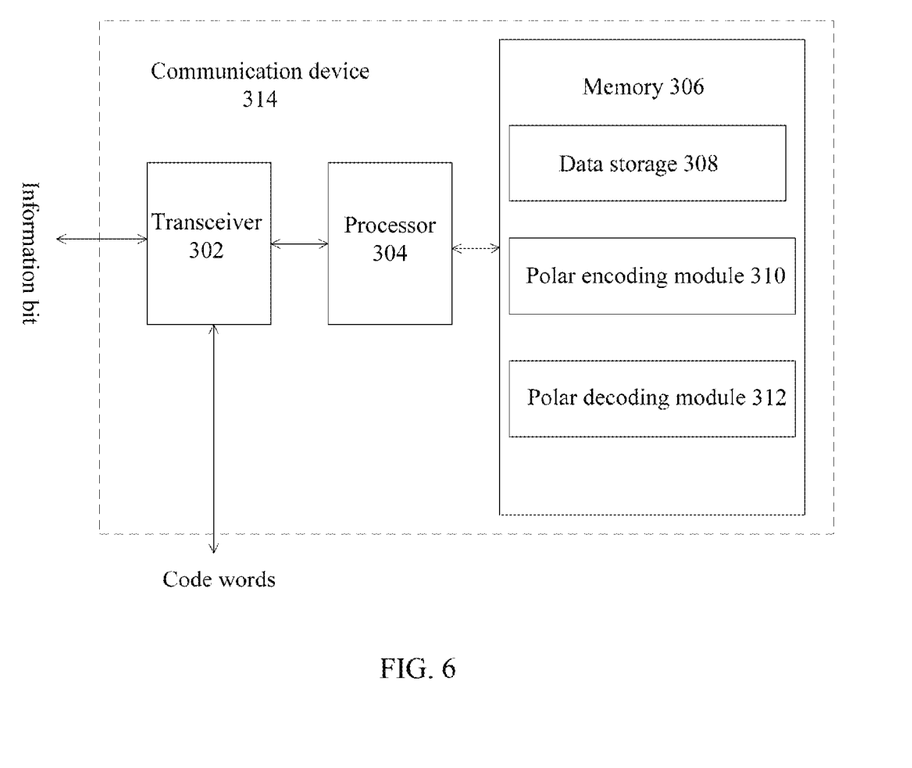
FIG. 6 is a structural block diagram of another communication device according to an embodiment of the present disclosure.

Specifically, as shown in FIG. 6, a communication device 314 includes a transceiver 302, a processor 304 and a memory 306. The transceiver 302 may receive data from or to the communication device 314. For example, the transceiver 302 can receive and/or transmit information bits between the communication device 314 and a CPU. The transceiver (encoder interface) 302 can further output and/or receive code words of the Polar codes between the communication device 314 and another communication device in the network. The memory 306 may include a data storage 308 that can be used as a local cache to store received information bits and/or code words. In addition, the memory 306 can also include non-transitory computer readable storage media (e.g. one or more non-volatile memory elements such as EPROM, eepm, flash memory, hard disk, and the like) that can store the following software modules: a Polar codes encoding module 310 that performs encoding in the manner of Polar codes encoding, and Polar codes decoding module 312 configured to decode the Polar codes codewords.

Optionally, the specific examples in this embodiment may refer to the examples described in the foregoing embodiment and the optional implementations, and will not be described herein again in this embodiment.

Obviously, those skilled in the art should understand that modules or steps of the foregoing disclosure may be implemented by a universal computing apparatus, and may be integrated in a single computing apparatus, or distributed on a network consisting of a plurality of computing apparatuses. Optionally, they may be implemented by executable program codes of the computing apparatus, such that they may be stored in a storage apparatus for execution by the computing apparatus; and in some cases, the steps shown or described may be performed in an order different from the one herein, or they may be respectively fabricated into integrated circuit modules, or a plurality of modules or steps may be fabricated into a single integrated circuit module. As such, the present disclosure is not limited to any specific combination of hardware and software.

The foregoing description is only a preferred embodiment of the present disclosure, and is not intended to limit the disclosure. For those skilled in the art, various changes and modifications may be made to the present disclosure. All the modification, equivalent substitution, or improvement made within the principle of the present disclosure shall fall within the protection scope of the present disclosure.

INDUSTRIAL APPLICABILITY

The present disclosure is applicable to the field of communication, and is used to improve the BLER performance in CSI reporting, thereby solving the problem that the position of various types of information in the CSI reporting cannot be reasonably mapped in the related art.

We claim:

1. A method for encoding channel state information (CSI), comprising:
obtaining an encoded bit sequence by performing Polar codes encoding of CSI and parity check bits input to a Polar codes encoder according to position indexes; and
transmitting the encoded bit sequence to a communication device,
wherein the CSI comprises a rank indicator (RI), padding bits, and at least one of a precoding matrix indicator (PMI) or a channel quality indicator (CQI),
wherein the RI, the padding bits, the PMI, and the parity check bits correspond to values of the position indexes from small to large, and
wherein a position of the RI is in front of a position of the padding bits, the position of the padding bits is in front of a position of the PMI, and the position of the PMI is in front of a position of the parity check bits.

2. The method of claim 1, wherein position indexes of the RI are firstly determined and a first type of position indexes are indexes having smallest index numbers and having a same quantity as that of the RI in a position index set.

3. The method of claim 2, wherein position indexes of the padding bits, position indexes of the at least one of the PMI or the CQI, and position indexes of the parity check bits are determined by:
determining position indexes having a same quantity as that of the parity check bits and having largest values in the position index set as the position indexes of the parity check bits; and
determining, according to an arrangement of position index values and quantities of the padding bits and the at least one of the PMI or the CQI, the position indexes of the padding bits and the position indexes of the at least one of the PMI or the CQI in sequence from undetermined position indexes in the position index set.

4. A communication device comprising a storage medium and a processor, the storage medium comprising a program stored therein, wherein the processor is configured to execute the program, and the program when executed causes the processor to:
obtain an encoded bit sequence by performing Polar codes encoding of channel state information (CSI) and parity check bits input to a Polar codes encoder according to position indexes; and
transmit the encoded bit sequence to another communication device,
wherein the CSI comprises a rank indicator (RI), padding bits, and at least one of a precoding matrix indicator (PMI) or a channel quality indicator (CQI),
wherein the RI, the padding bits, the PMI, and the parity check bits correspond to values of the position indexes from small to large, and
wherein a position of the RI is in front of a position of the padding bits, the position of the padding bits is in front of a position of the PMI, and the position of the PMI is in front of a position of the parity check bits.

5. The communication device of claim 4, wherein position indexes of the RI bits are firstly determined and a first type of position indexes are indexes having smallest index numbers and having a same quantity as that of the RI bits in a position index set.

6. The communication device of claim 5, wherein position indexes of the padding bits, position indexes of the at least one of the PMI or the CQI, and position indexes of the parity check bits are determined by:
determining position indexes having a same quantity as that of the parity check bits and having largest values in the position index set as the position indexes of the parity check bits; and
determining, according to an arrangement of position index values and quantities of the padding bits and the at least one of the PMI or the CQI, the position indexes of the padding bits and the position indexes of the at least one of the PMI and the CQI in sequence from undetermined position indexes in the position index set.

7. A method for decoding channel state information (CSI), comprising:

receiving, from a communication device, a bit sequence encoded by Polar codes, wherein the bit sequence comprises the CSI and parity check bits; and obtaining the CSI by performing Polar codes decoding of the bit sequence by a Polar codes decoder according to position indexes, wherein the CSI comprises a rank indicator (RI), padding bits, and at least one of a precoding matrix indicator (PMI) or a channel quality indicator (CQI), wherein the RI, the padding bits, the PMI, and the parity check bits correspond to values of the position indexes from small to large, and wherein a position of the RI is in front of a position of the padding bits, the position of the padding bits is in front of a position of the PMI, and the position of the PMI is in front of a position of the parity check bits.

* * * * *